United States Patent [19]

Taylor et al.

[11] 4,228,137
[45] Oct. 14, 1980

[54] METHOD OF PRODUCING FAUJASITE ZEOLITES EMPLOYING SEEDING TECHNIQUES

[75] Inventors: Dennis R. Taylor, Covina; Mark Jones, Anaheim, both of Calif.

[73] Assignee: Filtrol Corporation, Los Angeles, Calif.

[21] Appl. No.: 85,851

[22] Filed: Oct. 18, 1979

[51] Int. Cl.³ ............................................. C01B 33/28
[52] U.S. Cl. ..................................... 423/118; 423/329
[58] Field of Search ....................... 423/118, 328–330; 252/455 Z

[56] References Cited

U.S. PATENT DOCUMENTS

| | | | |
|---|---|---|---|
| 3,009,776 | 11/1961 | Sensel | 423/118 |
| 3,431,218 | 3/1969 | Plank et al. | 423/118 X |
| 3,433,589 | 3/1969 | Ciric et al. | 423/329 |
| 3,446,727 | 5/1969 | Secor | 208/120 |
| 3,510,258 | 5/1970 | Hindin et al. | 423/329 |
| 3,574,538 | 4/1971 | McDaniel et al. | 423/329 |
| 3,777,006 | 12/1973 | Rundell et al. | 423/118 |

FOREIGN PATENT DOCUMENTS

| | | | |
|---|---|---|---|
| 45-767 | 9/1964 | Japan | 423/118 |
| 980891 | 1/1965 | United Kingdom | 423/118 |

*Primary Examiner*—Edward J. Meros
*Attorney, Agent, or Firm*—Philip Subkow; Bernard Kriegel

[57] ABSTRACT

This invention relates to an improvement in the production of zeolites, particularly, zeolites of the faujasite type, employing clay based seeds derived from natural halloysite.

12 Claims, 1 Drawing Figure

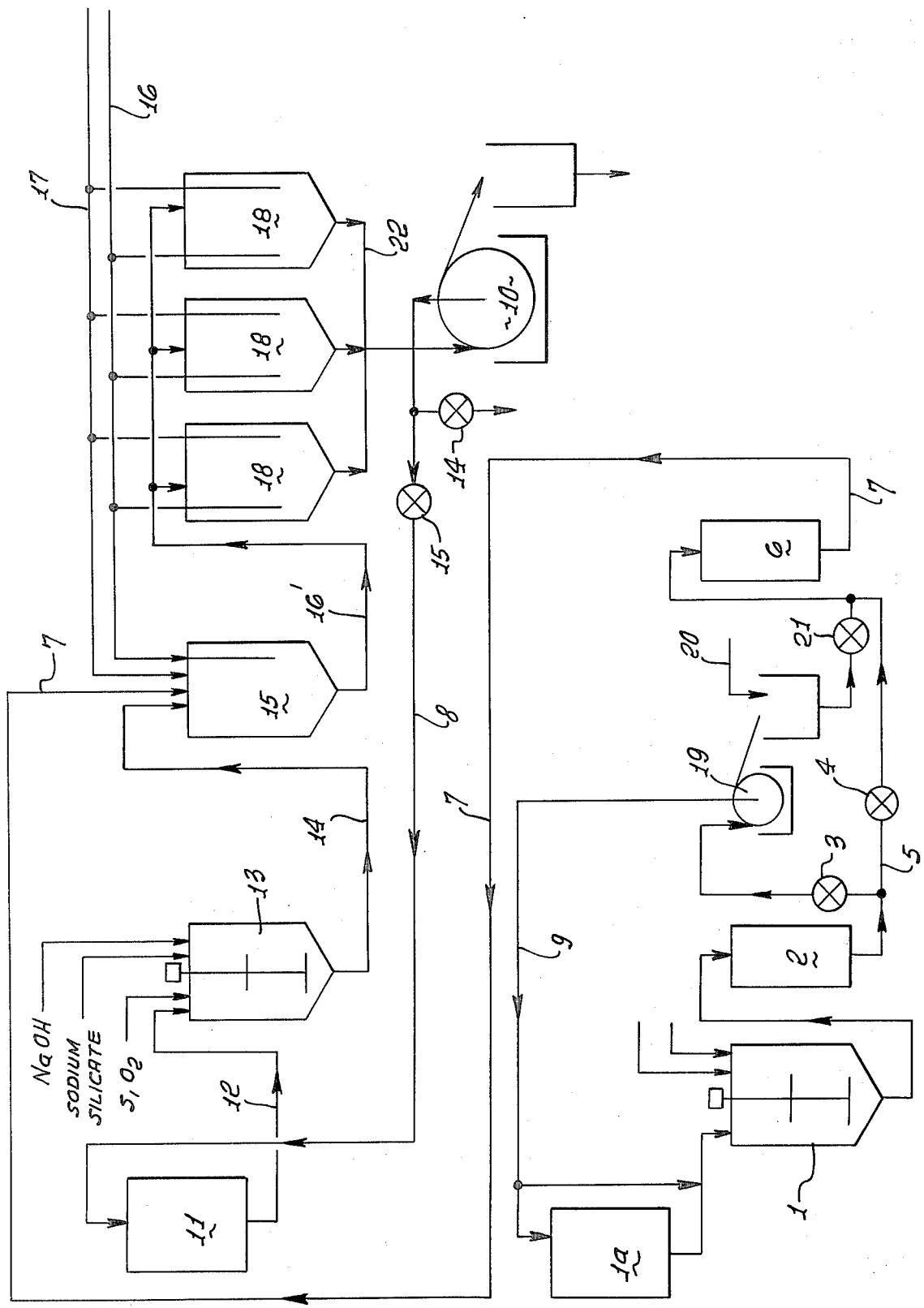

METHOD OF PRODUCING FAUJASITE ZEOLITES EMPLOYING SEEDING TECHNIQUES

BACKGROUND OF THE INVENTION

Processes for the production of such faujasite zeolites are well known (see for example, the X zeolite of Milton, U.S. Pat. No. 2,882,243, and the Y zeolite of Breck, U.S. Pat. No. 3,130,007) in which the source of the aluminum and silicon elements are soluble salts of the aluminum and silicon elements reported as $SiO_2$ and $Al_2O_3$. Instead of such soluble salts, clays are employed as a source of the $Al_2O_3$ and $SiO_2$ (see Howell, U.S. Pat. No. 3,119,600 and Secor, U.S. Pat. No. 3,446,727, and Secor, et al., U.S. Pat. No. 4,010,116). The literature relating to these processes is voluminous and the above listing is merely illustrative.

In all of these processes, the reaction mix which is required to form the zeolite contains a substantially higher ratio of $Na_2O:Al_2O_3$ and $SiO_2:Al_2O_3$ and $H_2O:Al_2O_3$ than in the zeolite product produced. The slurry of zeolite produced is filtered, and the filter cake is washed.

For the purposes of economy, filtrate is used to form a new batch of zeolite. The filtrate is adjusted in composition to provide the ratio of the $Na_2O/SiO_2:SiO_2/Al_2O_3:H_2O/Al_2O_3$ required in the reaction mix. This requires the addition of silica or alumina or aluminum and silicon salts or clay, depending upon the source of this $SiO_2$ and $Al_2O_3$ desired to reestablish the ratios of the reaction mix to produce the zeolite.

In the procedures, as set forth in the patents referred to above, and also used in commercial operations, the reaction mix is first digested at a relatively low temperature for a long period of time (the cold soak) and then heated to a higher temperature for an additional period of time (the hot soak). As set forth in Secor, et al., supra, open steam is used to heat the hot soak.

The low temperature period is an induction period during which amorphous nucleation centers develop and which then result in the generation of the crystallization phase in the hot soak. (See generally, Breck, "Zeolite Molecular Sieve", John Wiley & Sons, 1974, pp. 333, etc.)

STATEMENT OF THE INVENTION

This invention relates to the preparation of type Y faujasite zeolites employing the seeding techniques described in a copending application, Ser. No. 8,863 filed Feb. 2, 1979, assigned to the assignee of this application, and of which one of us is an applicant together with others. This application Ser. No. 8,863, is incorporated into this application by this reference. The background prior art discussed in the said application and cited by the Examiner is referred to, to indicate the state of the art.

In that application it has been shown that improved operating results may be obtained by employing clay derived nucleation centers, also termed seeds, and that where using clays among other alumina silicates in forming the seed that they must be calcined.

We discovered as is stated in said application that halloysite is unusual in that this clay may be used either in its calcined amorphous state or its natural crystalline state, i.e. in uncalcined state as mined.

This thus reduces the economic burden of the calcining step.

The advantages of improving the increase of the proportion of the filtrate from the filtration of the synthesized zeolite, described in said application is available when using the natural state as is obtained employing calcined halloysite or the other calcined silicates described in said application.

The advantage of desireable recirculation of filtrate is obtained when employing the entire seed slurry or when employing the nucleation centers after they are recovered by filtration (referred to as filtered seed in said application, obtained by use of the calcined silicates, may also be obtained by use of the natural halloysite according to our invention).

The procedures and reaction conditions for producing the seed either as slurry or as filtered seed described in said application, Ser. No. 8,863, may be used equally well with the natural halloysite.

While the reaction rates (that is the time required to achieve substantially the same composition in the zeolite produced at the end of the hot soak) are less when using the crystalline natural halloysite as compared with calcined amorphous halloysite or other meta kaolins, similar results are obtained when the digestion time in the cold soak, other reaction conditions, being similar are prolonged.

The herein invention as in the case of the above co-pending application, permits the use of an increased fraction of up to 100% of the filtrate, whether or not open steam is used in the process.

As in the case of the process of said copending application, we accomplished these results by either of two procedures. By restricting the composition of the cold soak employing the natural crystalline halloysites, and the time of digestion to relatively narrow limits, we may employ the resultant cold soak slurry as a component of the hot soak. By restricting the composition of the hot soak and the dilution by the use of open steam, we may obtain a zeolite of the desired $SiO_2$ to $Al_2O_3$ ratio and with good yields. Instead of using the entire seed slurry, we may filter the seed from the slurry. The filtered seed is added to the hot mix, and the filtrate mother liquor from the seed slurry may be used to make up additional seed material.

By using the filtered seed, open steam condensate can be tolerated and the addition of chemicals to the filtrate to establish the required reactant ratios is reduced and this also results in a high yield of zeolite. Furthermore, the additional $SiO_2$ usually required to make up the hot soak, may be added as sodium silicate instead of as active silica with a substantial reduction in the cost of production of the zeolite.

In our process, the entire alumina content present in the zeolite crystalization reaction mix is present in the zeolite which is formed. The filtrate is substantially free of aluminum expressed as $Al_2O_3$.

The invention will be further described by reference to the drawing.

The drawing is a schematic flow sheet of the process of our invention.

In the drawing, the cold soak of suitable composition compounded in tank 1 is discharged and held in tank 2 at ambient temperature of 60° to 90° for a period of time of 24–72 hours. If the cold soak seed slurry is to be used in the hot soak, it passes through line 5, under control of valves 3 and 4 into the hold tank 6. The hot soak is compounded in tank 13. The filtrate from filter 10 is passed via line 8 to hold tank 11. From tank 11, it goes via line 12 to tank 13 where it is adjusted in composition by the addition of NaOH, sodium silicate and fumed silica. Where not all of the filtrate is used to establish the hot soak composition, a part may be discarded by suitable control of valves 15 and 14. The mixture in tank 13 is passed through line 14 into the digestion tank 15 where the additional alumina is added for example as sodium aluminate. Cold soak material passes through line 7 into tank 15 where it is mixed with hot soak material and heated to a temperature in the range of about 170° to about 200° by open steam, introduced through pipe 16, which is blown through the liquid in tank 15. After suitable mixing, the zeolite slurry is pumped via line 16' to tanks 18. Steam from line 16 heats the reaction mix to the desired temperature in the above range and consequently is in part condensed. It also acts to cause an agitation of the mixture to help to maintain a near uniform mixture. The action may be supplemented by air introduced through line 17.

After a suitable digestion period, usually in the range from about 24 to 72 hours, the mixture in tank 18 passes through line 22 and is filtered on filter 10 and the mother liquor filtrate is circulated through line 8 as above. The further processing of the filter cake by washing and exchange reaction for use as a component of a zeolite containing catalysts is well known and needs no further discussion.

Instead of employing the entire seed slurry as described above, we prefer to filter the slurry and to use the filtered seed as a component in the hot soak. This is illustrated in FIG. 1. Valve 4 is closed and valve 3 is opened. The seed slurry from tank 2 is filtered on filter 19 and the mother liquor filtrate is returned via line 9 to tank 1a to make up a further batch of cold soak. The filter cake, washed if desired, is removed from the filter and slurried with water from line 20 and passed through 21 to hold tank 6 and passed via line 7 to tank 15 and added to the hot soak slurry mixture formed in 13 to form a part of the hot soak. We prefer to employ the filtered seed and to wash the seed filter cake with water to a constant $Na_2O$ content in the filter cake, i.e., one that does not change substantially further washing.

The sources of the aluminum, the silicon, and the sodium, may be added to the cold soak and the hot soak as sodium hydroxide and with clay, when used as the source of aluminum, and supplementary source of silicon and sodium as described below. The yield of zeolite, i.e., the weight of zeolite volatile free, which contains a mole of alumina based on the total weight of the reaction mix containing one mole of alumina, depends upon the total weight of all the components in the reaction mix. In the above relationship, the zeolite weight is taken on a volatile free basis. The yield is expressed as the weight ratio of the volatile free zeolite to the above total weight, as percent.

The hot soak composition may be formed as a synthetic mix using chemicals in the form of molecular or colloidal solutions as the source of $Na_2O$, $SiO_2$ and $Al_2O_3$, such as sodium silicate and silica sols or gels and alumina sols or gels or sodium aluminate or alumina cogels as sources of silica and alumina. We refer to such hot soak composition as synthetic and the resultant zeolite as synthetic. We may, however, employ metakaolin or halloysite, either calcined or acid treated, as a source of alumina and silica, supplemented, if necessary, by the above chemicals in either the cold soak or the hot soak. The slurry or the filter cake derived therefrom is known as "clay based". When the "hot soak" is formed from clay it is also termed "clay based".

While we prefer to employ the cold soak filter cake for addition to the hot soak slurry, we may also employ the dried or the dried and calcined seed for incorporation into the hot soak slurry.

In the usual operation, the seed slurry and the filtered seed is circulated to the hot soak promptly as it is formed. Where there is to be any substantive delay or it is desired to store the seed slurry or the filtered seed, it is preferred that the seed be in the form of dried or calcined filtered seed.

In such case, the dried or calcined filtered seed may be conveniently stored for future use. Such a procedure will avoid the danger of an undesirable change in the nature of the amorphous nucleation centers, i.e. due to prolonged digestion during storage.

A singular practical advantage of using filtered seeds as compared to employing the seed slurry, as additive to the hot soak is that it permits employing a wider range of compositions of the hot soak and a more flexible utilization of open steam to heat the hot soak. The latter property is of particular practical importance since heating by passing open steam through the body of the hot soak material to both heat the hot soak and to produce a mild agitation and mixing of the material in the hot soak is a practical necessity when large bodies in the order of 25 to 30 tons of hot soaks slurry are processed in single batches. The heating, for example, causes condensation which increases the water content from about 10% up to about 20% in a usual case, depending on the weather. The following examples are illustrations of our invention. In all of the Examples and Tables wherever clay is referred to it was calcined kaolin, i.e., metakaolin, amorphous as determined by x-ray.

The following example illustrates the results produced when the natural crystalline halloysite and crystalline kaolin are used as compared with the results obtained when using the calcined halloysite, or calcined kaolin (meta kaolin) and halloysite which are amorphous to x-ray.

EXAMPLES

Cold soak compositions formed of crystalline halloysite and calcined i.e. amorphous halloysite and also crystalline kaolin and amorphous metakaotin are formed, each having the nominal composition equivalent to 11 moles of $Na_2O$, 11.3 moles of $SiO_2$, and 240 moles of water per mole of $Al_2O_3$, derived from the clay by like addition of sources of sodium and silicon. The cold soak was digested at room temperature and sampled at various times as shown in the following table 1.

Each sample was formulated into a synthetic hot soak mix having the nominal composition equivalent to 3.4 moles of $Na_2O$, 9.5 moles of $SiO_2$, 1 mole of $Al_2O_3$ and 175 moles of $H_2O$ including the above clays. The added cold soak seed slurry was used in amount sufficient to supply 5% of the alumina requirement of the hot soak. The hot soak was digested at a temperature of 180° to 190° F. for the times indicated in the following Table 1 (as make time). The composition of the derived zeolite as a function of cold soak digestion time and the time to obtain a zeolite having the desired composition are shown.

TABLE 1

| Clay Used (cold soak Digestion-hrs) | FORM OF CLAY USED IN COLD SOAK ||||||||||
|---|---|---|---|---|---|---|---|---|---|---|
| | Crystalline (Uncalcined) ||||| Amorphous (Calcined) |||||
| | % Zeol. Type ||| Prod. S/A | Make Time | % Zeol. Type ||| Prod. S/A | Make Time |
| | % B | % S | % Y | | | % B | % S | % Y | | |
| Halloysite | | | | | | | | | | |
| (24 hrs.) | 20 | 14 | 75 | 4.4 | 40 | 4 | 0 | 100 | 4.5 | 24 |
| (48 hrs.) | 10 | 8 | 91 | 4.4 | 52 | 0 | Tr | 106 | 4.4 | 20 |
| (72 hrs.) | 0 | 0 | 100 | 4.5 | 17 | 0 | 0 | 106 | 4.5 | 13 |
| Kaolin | | | | | | | | | | |
| (24 hrs.) | | | | | | 0 | 4 | 95 | 4.3 | 24 |
| (48 hrs.) | | | | | | 3 | 3 | 94 | 4.4 | 24 |
| (72 hrs.) | 0 | Tr | 5 | — | 40 | | | | | |
| (108 hrs.) | | | | | | 3 | 0 | 95 | 4.4 | 16 |

For identification of zeolite B (also known as zeolite P) and S, see Breck "Zeolite Molecular Sieve", John Wiley and Sons 1974 Index.

The percent of Y, S and B were determined by comparing the peak intensities of the attained product with standard x-ray spectra of well crystallized zeolite S or B or Y determined under like x-ray spectrographic conditions. The peak height of the several zeolites are stated as a percent of the peak height of the standard. The $SiO_2/Al_2O_3$ (S/A in Table 1) ratio was determined from the x-ray pattern.

While the hot soak and cold soak time to reach equivalent Y zeolite compositions for like cold soak compositions is greater when using natural halloysite, the cold soak using natural halloysite can achieve a zeolite of substantially the same composition if the cold soak digestion time is suitably prolonged. The total elapsed time is not significantly different from those usually employed in prior art processes not employing the seeding techniques.

In contrast to the results attained using natural halloysite in the hot soak after 72 hours cold soak digestion, uncalcined kaolin, after 72 hours cold soak when combined with the hot soak of the above composition and hot soak digestion for 40 hours gave only about 5% of Y and only a trace of B.

This may be compared with calcined kaolin (metakaolin) used in the place of natural kaolin or the natural halloysite in the above cold soak and hot soak formulation after 24 hours of hot soak, gave a Y zeolite of 4.4 $SiO_2/Al_2O_3$ mole ratio which contained 95% of Y and 0% of B and 4% of S.

In our preferred embodiment of our invention, the said hot soak compositions according to our invention both where the aged cold soak containing the amorphous nucleation centers that is seeds, as well as when the filtered seed is employed, is formed by adding the seed slurry or the filtered seed in amount to supply from about 3 to above 10% by weight of the $Al_2O_3$ requirement of the hot soak. The cold soak compositions to be employed according to our invention are those which when aged for the proper time and temperature will be suitable for addition to the above hot soaks to give purity and yield.

We prefer to employ the filtered seed produced as a result of aging of the above selected cold soak compositions instead of the slurry from which the filtered seed is derived.

Where as described herein, the cold soak or the hot soak is clay derived, the nominal $SiO_2$ content of the clay is supplemented by a source of $SiO_2$ which may be for example sodium silicate or active silica, for example fumed silica or silica sol. The nominal sodium content may be supplied as NaOH so as to establish the molar ratios described below.

The process of our invention includes therefor forming a hot soak derived either from clay or synthetic hot soak composition in the molar ranges of:

$Na_2O$ = about 3 moles to about 7 moles
$SiO_2$ = about 7 moles to about 16 moles
$Al_2O_3$ = 1 mole
$H_2O$ = about 120 moles to about 280 moles The $Na_2O/SiO_2$ molar ratio about 0.3 to about 0.5, $H_2O/Na_2O$ ratios from about 30 to about 70, employing a cold soak derived from natural crystalline halloysite and sodium hydrosite and silica and said cold soak having a molar composition in the following ranges:

$Na_2O$ = about 5 moles to about 29 moles
$SiO_2$ = about 5 moles to about 17 moles
$Al_2O_3$ = 1 mole
$H_2O$ = about 100 moles to about 620 moles and holding the cold soak mixture for about 24 to 72 hours at ambient temperatures of about 60°–90° F.

The treated cold soak is employed to provide from about 3% to about 10% of the $Al_2O_3$ requirement of the above hot soak.

Holding said hot soak at a temperature of about 150° to about 200° F. for a period of time (usually 24 to 72 hours) to produce a yield of crystalline product in excess of about 60%, for example or more.

We prefer, however, instead of using the entire digested cold soak to be added to form the hot soak, to filter the digested cold soak and to add the filter cake to the hot soak to provide the 3 to 10% of the required alumina.

We prefer, moreover, to employ hot soak compositions which yield 12% or more of the zeolite containing at least 85% of the Y zeolite and to employ the cold soak compositions after digestion which will give the above results.

Such preferred hot soak compositions are those having a molar composition in the following ranges:

$Na_2O$ = about 3 moles to about 4 moles
$SiO_2$ = about 7 moles to about 11 moles
$Al_2O_3$ = 1 mole
$H_2O$ = about 120 moles to about 160 moles and the preferred cold soak derived from natural halloysite as described above having the following molar composition:

$Na_2O$ = about 5.75 moles to about 17 moles
$SiO_2$ = about 5 moles to about 15 moles
$Al_2O_3$ = 1 mole
$H_2O$ = about 100 moles to about 320 moles These ranges of compositions are applicable when longer cold soak age periods are employed (up to about 98 hrs. or higher). A most preferred range for cold soak compositions where an age period of at least about 24 hours is practiced would be:

$Na_2O$ = about 11 moles to about 17 moles
$SiO_2$ = about 10 moles to about 12 moles
$Al_2O_3$ = 1 mole
$H_2O$ = about 200 moles to about 250 moles The preferred and the most preferred compositions of the cold soaks derived from natural crystalline halloysites each when formulated for digestion contains sodium, expressed as $Na_2O$ and silica ($SiO_2$) in molar ratios expresses as $Na_2O/SiO_2$ which are substantially greater than those for the corresponding hot soak composition and a molar ratio expressed as $H_2O/Al_2O_3$ which is substantially less than for the corresponding hot soak.

Thus, for the above preferred ranges for the hot soak, the ratio is for $Na_2O/SiO_2$ from about 0.8 to about 1.5 and for $H_2O/Na_2O$ from about 14 to about 27. For the most preferred range the $Na_2O/SiO_2$ ratio is from about 0.9 to about 1.5 and for $H_2O/Na_2O$ from about 14 to about 27. For the most preferred range the $Na_2O/SiO_2$ ratio is from about 0.9 to about 1.5 and for $H_2O/Na_2O$ from about 14 to about 22.

We prefer to employ the filtered seed produced from the above cold soak compositions. Such filtered seeds to have molar composition in the following range on a volatile free basis:

$Na_2O$ = about 0.84 moles to about 1.16 moles
$SiO_2$ = about 2.28 moles to about 3.00 moles
$Al_2O_3$ = 1 mole and the filter cake may contain:

$H_2O$ = about 40 moles to about 70 moles

In each case the slurry or the filtered seed usually the filter cake containing water as above, is added in amount sufficient to add about 3 to about 10% of the $Al_2O_3$ required in the hot soak.

We prefer to employ the compositions in the above ranges which would permit the use of open steam and dilutions such as will enable the use of all of the hot soak filtrate produced on filtration of the desired crystalline component from the high temperature digestion of the hot soak.

The composition and conditions of the process as described in connection with FIG. 1 is that which we presently prefer.

The following composition is our presently preferred embodiment of the process illustrated in FIG. 1, employing uncalcined halloysite.

The synthetic hot soak ratio to be established in Tank 13 (FIG. 1) is as follows:

$$3.3\ Na_2O : 9.5\ SiO_2 : 1.0\ Al_2O_3 : 130\ H_2O$$

The hot soak is formulated by adding to the filtrate a filtered seed having the following molar composition:

$$0.90\ Na_2O : 2.7\ SiO_2 : Al_2O_3 : 56\ H_2O$$

in amount to add about 4.5% of the $Al_2O_3$ requirement of the hot soak. The remainder of the ingredients are supplied by the addition of sodium hydroxide, sodium aluminate and fumed silica to the recycled hot soak filtrate from the crystallized zeolite.

The natural halloysite derived cold soak from which the seed is derived is of the following molar composition:

$$13\ Na_2O : 11.3\ SiO_2 : Al_2O_3 : 240\ H_2O$$

It is formulated by employing natural uncalcined halloysite as the alumina source supplemented by sodium silicate and sodium hydroxide.

The cold soak batch is digested for 24 hours at ambient room temperature, for example, about 70°, filtered and the filter cake added to the hot soak makeup tank. The hot soak batch is then digested for about 16 to 32 hours for example 24 hours at 200°–210° F. obtained by blowing open steam through the hot soak batch. The hot soak batch is filtered and the filter cake washed. The hot soak filtrate is passed to the hot soak makeup tank.

The filter cake in our preferred embodiment will contain about 90% to about 95% of a Y type zeolite of $SiO_2/Al_2O_3$ ratio in the range of about 4.9–5.2.

Such zeolites are usefully employed as components of cracking catalysts for petroleum fractions when mixed in a matrix such as clay, and alumina as is well known in this art. Such zeolites have had a long and successful commercial history for such uses.

We claim:

1. The process of producing a faujasite zeolite having a $SiO_2/Al_2O_3$ molar ratio in excess of three (3) which comprises digesting, at a relatively low temperature, a water mixture of natural crystalline halloysite as a source of aluminum and silicon and a source of sodium and forming seed in a mother liquor; forming a hot soak composed of a mixture in water of a source of aluminum, silicon and sodium including said seeds and digesting said hot soak at a higher temperature than said relatively low temperature, and forming said zeolite, in a mother liquor, separating said zeolite from said last named mother liquor, the $Na_2O/SiO_2$ molar ratio in said cold soak being substantially in excess of the $Na_2O/SiO_2$ ratio in the hot soak and the $H_2O/Na_2O$ ratio in the cold soak being substantially less than in the said hot soak.

2. The process of claim 1 in which the source of sodium and silicon in said first named water mixture includes the hot soak mother liquor derived from a process according to claim 1.

3. The process of production of a zeolite of the faujasite type, having a $SiO_2/Al_2O_3$ molar ratio in excess of three (3) which comprises digesting at a relatively low temperature a cold soak composition comprising a water mixture including crystalline halloysite, and also an additional source of $SiO_2$, and a source of sodium, said cold soak having a nominal molar composition expressed as $Na_2O$, $SiO_2$, $Al_2O_3$, and $H_2O$ in ranges substantially for $Na_2O$ about 5 moles to about 29 moles, for $SiO_2$ equal to about 5 moles to about 17 moles, and for $H_2O$ about 100 moles or about 620 moles per mole of $Al_2O_3$ digesting said mixture at said relatively low temperature to form seeds in a mother liquor, adding said seeds and said mother liquor and an additional source of silicon, aluminum, and sodium to a hot soak, said hot soak including said seeds and said mother liquor having a nominal molar composition expressed as $Na_2O$, $SiO_2$, $Al_2O_3$, and $H_2O$ in ranges substantially equal for $Na_2O$, about 3 moles to about 7 moles, for $SiO_2$ about 7 moles to about 16 moles, for $H_2O$ about 120 moles to about 280 moles per mole of $Al_2O_3$, the $Na_2O/SiO_2$ molar ratio in said cold soak being substantially greater than the $Na_2O/SiO_2$ ratio in said hot soak and the $H_2O/Na_2O$ molar ratio in said cold soak being substantially less than the $H_2O/Na_2O$ ratio in the hot soak, digesting said hot soak at a higher temperature than said relatively low temperature to form said zeolite, in a mother liquor, separating said zeolite from the hot soak mother liquor.

4. The process of claim 3 in which the source of sodium and silicon includes the hot soak mother liquor derived from a process according to claim 3.

5. The process of producing a faujasite zeolite having a $SiO_2/Al_2O_3$ molar ratio in excess of four (4) which comprises digesting at a relatively low temperature a water mixture of a source of aluminum and silicon derived from crystalline halloysite, and an additional source of silicon, and a source of sodium to form seeds in a mother liquor, separating said seeds from said mother liquor said seeds having a nominal molar composition expressed as $Na_2O$, $SiO_2$, and $Al_2O_3$ substantially in the following ranges, for $Na_2O$, about 0.84 moles to about 1.2 moles, for $SiO_2$, about 2.3 moles to about 3 moles per mole of $Al_2O_3$, forming a hot soak including said seeds, digesting said hot soak at a higher temperature than said relatively low temperature to form said zeolite in a mother liquor, separating said zeolite from the hot soak mother liquor.

6. The process of claim 5 in which the source of sodium and silicon in said cold soak includes the hot soak mother liquor derived from a process according to claim 5.

7. The process of producing a faujasite zeolite having a $SiO_2/Al_2O_3$ molar ratio in excess of three (3) which comprises digesting, at a relatively low temperature, a water mixture of a source of aluminum and silicon, derived from crystalline halloysite, an additional source of silicon, and a source of sodium and forming seed in a mother liquor, separating said seeds from said mother liquor, separating said seeds from the said mother liquor adding said seeds to additional sources of aluminum, silicon, and sodium to form a hot soak, digesting said hot soak at a higher temperature than said relatively low temperature to form said zeolite in a mother liquor, separating said zeolite from said last named mother liquor.

8. The process of claim 7 in which the source of sodium and silicon in said cold soak includes the hot soak mother liquor derived from a process according to claim 7.

9. The process of production of a zeolite of the faujasite type, having a $SiO_2/Al_2O_3$ molar ratio in excess of three (3) which comprises digesting, at a relatively low temperature, a cold soak composition comprising a water mixture of a source of aluminum and silicon, derived from crystalline halloysite, and an additional source of silicon, and a source of sodium to form seeds in a mother liquor, said cold soak having a nominal molar composition expressed as $Na_2O$, $SiO_2$, $Al_2O_3$ and $H_2O$ in ranges substantially in the following ranges, for $Na_2O$ from about 5 moles to about 29 moles, for $SiO_2$ equal to about 5 moles to about 17 moles, and for $H_2O$ about 100 moles or about 620 moles per mole of $Al_2O_3$, forming seeds in a mother liquor, adding said seeds and a source of silicon, aluminum and sodium source expressed as $Al_2O_3$, $SiO_2$, and $Na_2O$, to form a hot soak, said hot soak having a nominal molar composition expressed as $Na_2O$, $SiO_2$, $Al_2O_3$ and $H_2O$ in ranges substantially equal for $Na_2O$, of about 3 moles to about 7 moles, for $SiO_2$ about 7 moles to about 16 moles, for $H_2O$ of about 120 moles to about 280 moles per mole of $Al_2O_3$, digesting said hot soak at a higher temperature than said relatively low temperature to form said zeolite in a mother liquor, separating said zeolite from the hot soak mother liquor.

10. The process of claim 9 in which the source of sodium and silicon in said cold soak includes the hot soak mother liquor derived from a process according to claim 9.

11. The process of producing a faujasite zeolite having a $SiO_2/Al_2O_3$ molar ratio in excess of three (3) which comprises digesting at a relatively low temperature a water mixture of a source of aluminum and silicon derived from crystalline halloysite, and an additional source of silicon, and a source of sodium to form seeds in a mother liquor, separating said seeds from the mother liquor, said seeds having a nominal molar composition expressed as $Na_2O$, $SiO_2$, and $Al_2O_3$ in the following ranges, for $Na_2O$ about 0.84 moles to about 1.2 moles, for $SiO_2$ about 2.3 moles to about 3 moles per mole of $Al_2O_3$, forming a hot soak including said seeds having a composition expressed as $Na_2O$, $SiO_2$ and $Al_2O_3$, substantially for $Na_2O$ in the range of about three (3) moles to about four (4) moles, for $SiO_2$ in the range of about 7 moles to about 11 moles, for $H_2O$ in the range of about 120 moles to about 160 moles per mole of $Al_2O_3$, digesting said hot soak at a higher temperature than said relatively low temperature to form said zeolite in a mother liquor, separating said zeolite from the hot soak mother liquor.

12. The process of claim 11 in which the source of sodium and silicon in said cold soak includes the hot soak mother liquor derived from a process according to claim 11.

* * * * *